US010489231B1

(12) United States Patent
Gabay et al.

(10) Patent No.: US 10,489,231 B1
(45) Date of Patent: Nov. 26, 2019

(54) MESSAGING FOR ASSESSMENT OF TELECOMMUNICATION ISSUES

(71) Applicant: Amazon Technologies, Inc., Seattle, WA (US)

(72) Inventors: Ben Zion Gabay, Palo Alto, CA (US); Antony James Lofthouse, Sunnyvale, CA (US); Kenneth James Albanowski, Fremont, CA (US); Jonas Daniel Larsson, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 282 days.

(21) Appl. No.: 14/566,223

(22) Filed: Dec. 10, 2014

Related U.S. Application Data

(60) Provisional application No. 62/069,285, filed on Oct. 27, 2014.

(51) Int. Cl.
*G06F 11/07* (2006.01)

(52) U.S. Cl.
CPC ........ *G06F 11/079* (2013.01); *G06F 11/0709* (2013.01)

(58) Field of Classification Search
CPC .......................... G06F 15/16; G06F 17/30017
See application file for complete search history.

(56) References Cited

U.S. PATENT DOCUMENTS

| 6,976,071 | B1 * | 12/2005 | Donzis | ................ | H04L 43/0811 709/224 |
| 2007/0107034 | A1 * | 5/2007 | Gotwals | ................. | H04H 20/12 725/129 |
| 2008/0056153 | A1 * | 3/2008 | Liu | ..................... | H04L 12/2602 370/252 |
| 2011/0286447 | A1 * | 11/2011 | Liu | ......................... | H04L 45/74 370/389 |
| 2014/0019641 | A1 * | 1/2014 | Kitamura | ................ | H04L 12/66 709/244 |

OTHER PUBLICATIONS

RFC2460 Internet Protocol, Version 6 Specification Dec. 1998.*

* cited by examiner

*Primary Examiner* — Jeffrey M Rutkowski
*Assistant Examiner* — Basil Ma
(74) *Attorney, Agent, or Firm* — Eversheds Sutherland (US) LLP

(57) ABSTRACT

Embodiments of the disclosure provide messaging for assessment of telecommunication issues or other types of operational issues in networks that provide a service. In one embodiment, a client device (such as a computing device) that consumes information from a service provided via a network can determine a service performance issue. In response, in certain embodiments, the client device can probe multiple network components in the network by sending multiple messages to each of the multiple network components. The client device can determine a response to the messages from at least one of the multiple network components, and can leverage the response in order to determine an operating condition of and/or assign an operating condition status to at least one of the network components. As such, in certain embodiments, the client device can identify connectivity issues, communication infrastructure issues, and/or networking issues at the network.

20 Claims, 5 Drawing Sheets

MESSAGING FOR ASSESSMENT OF TELECOMMUNICATION ISSUES

CROSS-REFERENCE TO RELATED APPLICATION

This application claims priority to U.S. Provisional Application No. 62/069,285, filed on Oct. 27, 2014, which is hereby incorporated herein by reference in its entirety.

BACKGROUND

A device that accesses information via a telecommunication network typically relies on numerous network components, such as access points, routers, links, servers, and the like, in order to receive the information. Telecommunication issues that can be detrimental to satisfactory access to the information may be difficult to identify.

BRIEF DESCRIPTION OF THE DRAWINGS

The accompanying drawings form part of the disclosure and are incorporated into the subject specification. The drawings illustrate example embodiments of the disclosure and, in conjunction with the present description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like, but not necessarily the same or identical, elements throughout.

DETAILED DESCRIPTION

Figure 1:
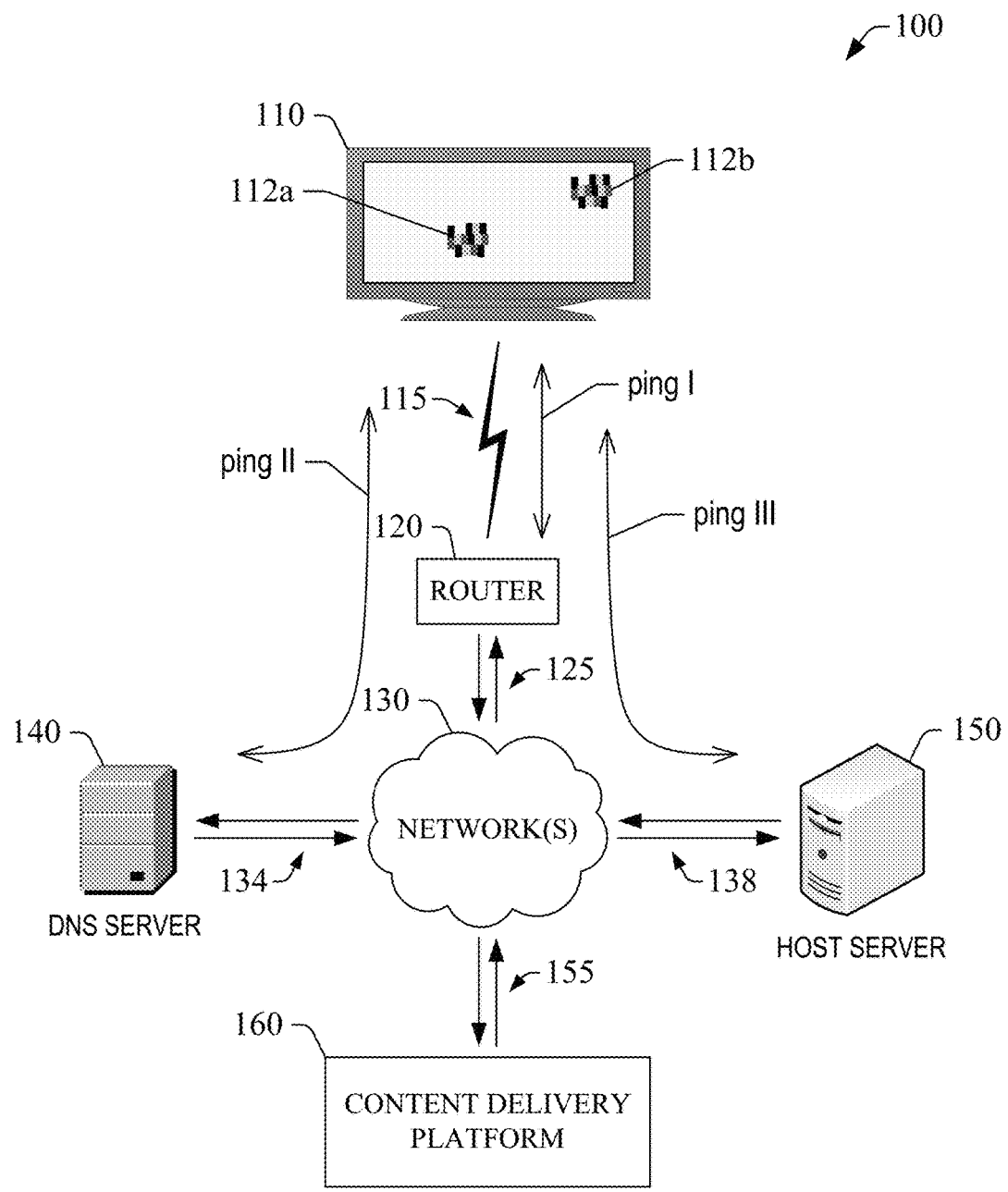
FIG. 1 illustrates an example of an operational environment for assessment of telecommunication issues via messaging in accordance with one or more embodiments of the disclosure.

The disclosure recognizes and addresses, in at least certain embodiments, the issue of identification of sources of telecommunication issues or other types of operational issues in client devices that consume information via a service provided by a network (such as a telecommunication network, a cable network, or the like). More particularly, yet not exclusively, embodiments of the disclosure provide messaging for assessment of telecommunication issues in networks that provide a service. In one embodiment, a client device (such as a computing device) that can consume information from a service provided via a network can determine a service performance issue (e.g., lack of access to the service or issues while accessing the service). In response, the client device can probe multiple network components in the network by transmitting or otherwise sending one or more messages to each of the multiple network components. In certain embodiments, prior to transmitting for otherwise sending at least one of the one or more messages, the client device can generate the at least one message. The client device can determine a response to the message(s) from at least one of the multiple network components, and can leverage the response in order to determine an operating condition of and/or assign an operating condition status to at least one of the network components. As such, in certain embodiments, the client device can identify connectivity issues, communication infrastructure issues, and/or networking issues at the network. While a content streaming service is utilized to illustrate various embodiments and/or aspects of the assessment of telecommunication issues via messaging, the disclosure is not so limited and any service that provides (e.g., generates and/or communicates) information is contemplated herein. In addition, it should be appreciated that the network components can include ad-hoc components that can communicate in a short-range point-to-point fashion with the client device. Further, while the messaging is illustrated as being implemented among communication endpoints and the client device, it should be appreciated that the messaging described herein also can be implemented among any sockets in a computing platform in order to evaluate issues in communication between two or more sockets related to services such as serving queries or fulfilling library calls.

In accordance with the present disclosure, client devices that can utilize or otherwise leverage messaging for assessment of telecommunication issues generally include one or more processors and one or more memory devices; communication devices (e.g., a system bus, a memory bus, or the like); input/output interface(s) that can include a connector or other type of adapter, and/or display device(s); and/or a radio unit for wireless communication. A client device of the disclosure can have one of a variety of form factors and can be functionally coupled to other computing devices in order to consume or otherwise receive information from a service. In one example, a client device in accordance with this disclosure can be embodied in a tethered computing device or a portable computing device, such as a mobile tablet computer, an electronic book reader (also referred to as an e-reader), a mobile telephone (e.g., a smartphone), a dongle integrated with computing functionality, and the like. In another example, the client device can be embodied in or can include a wearable computing device, such as a watch, goggles or head-mounted visors, or the like. In yet another example, the client device can be embodied in or can include portable consumer electronics equipment, such as a camera, a media reproduction device, a portable television set, a gaming console, a navigation device, and the like.

With reference to the drawings, FIG. 1 illustrates an example operational environment 100 for assessment of telecommunication issues via messaging in accordance with one or more embodiments of the disclosure. A client device 110, which is represented for the sake of illustration as a television set, can access wirelessly a service provided by a network. The service can include a content streaming service or other services that can provide information (e.g., data, metadata, and/or signaling) to the client device 110. As such, the client device 110 can be functionally coupled (e.g., communicatively coupled) with a router 120 via one or more wireless communication links 115 (collectively referred to as "link(s) 115"). The link(s) 115 which can include an upstream link (UL) and/or a downstream link (DL), and, in certain embodiments, one or more access points or other communication devices. As such, in certain embodiments, the router 120 can exchange information (e.g., receive and/or transmit information) with an access point included in the links 115, where the access point can exchange information wirelessly with the client device 110 according to one or more radio technology protocols, such as Wi-Fi, Bluetooth, Zigbee, or the like. In certain embodiments, such an access point and the router 120 can be integrated into a single component (such as a gateway, which also may be referred to as a router) having wireline and wireless communication functionality. The information that is exchanged can include digital content that can be transmitted, as part of the service, for example, from the router 120 to the client device 110 in nearly real-time (which also can be referred to as being "streamed" to the client device 110). Therefore, it should be appreciated that connectivity or lack thereof between the client device 110 and the router 120 can dictate the quality or perceived quality of the service accessed at the client device 110.

In order to provide digital content to the client device 110, the router 120 can be functionally coupled to a group of one or more networks 130 via one or more communication links 125. The group of network(s) 130 can include wireless and/or wireline networks of various footprints (e.g., a wide area network (WAN), a metropolitan area network (MAN), a local area network (LAN), a home area network (HAN), and/or a personal area network (PAN)). At least a portion of the network(s) 130 can be referred to as an access network in that it can permit the client device 110 to access information from various sources and/or other network components. Therefore, in one aspect of such access, a domain name system (DNS) server 140 can be functionally coupled to one or more network components of the network(s) 130 via one or more communication links 134. The communication links 134 can include UL(s) and/or DL(s), each of which can be wireless or wireline link(s). The DNS server 140 can be administered by a service provider that can provide networking services, such as data services, to the client device 110. More specifically, the service provider can provide communication conduits and/or components, such as an access network and one or more DNS servers (not depicted in FIG. 1), that can permit the client device 110 to access remote sources of information, such as host servers of various kinds, including web servers, virtual private network (VPN) servers, location services servers, emergency servers (e.g., E911 servers), combinations thereof, or the like, that can maintain or otherwise permit communication between the client device 110 and remote computing devices and/or information storage devices.

In one aspect, the DNS server 140 can permit resolving names of host servers that can be functionally coupled to the network(s) 130 and can provide various types of information (such as web-based content). As illustrated, in the example operational environment 100, a host server 150 can be functionally coupled to the network(s) 130, or a component thereof, via one or more communication links 138. The host server 150 can permit transmission of information (e.g., content, metadata, and/or signaling) to the client device 110 from the host server 150 and/or one or more network components functionally coupled to the host server 150. In addition or in other embodiments, the host server 150 can permit the exchange of information with the client device 110.

Digital content streamed to the client device 110 can be generated at one or more remote computing devices, which can be collectively referred to as a content delivery platform 160. As illustrated, the content delivery platform 160 can be functionally coupled to one or more network components of the network(s) 130 via one or more communication links 155. Similar to other links herein, the communication link(s) 155 can include UL(s) and/or DL(s), which can include wireless or wireline link(s). In certain embodiments, the content delivery platform 160 can be embodied in or can include a content delivery network (CDN), an Internet protocol (IP) multimedia subsystem (IMS) network, or other type of network or network component that can provide content, metadata, and/or signaling. It should be appreciated that while embodiments of the disclosure are illustrated with reference to content delivery services and/or platforms, the disclosure is not so limited and other types of services and/or platforms that provide information also are contemplated in this disclosure.

In certain implementations, such as in streaming of content, the host server 150 can host a website that can present content available for streaming. In response to selection of such content, the host server 150 (e.g., a web server) can permit transmission of the content from the content delivery platform 160 to the client device 110 via one or more of the network(s) 130, one or more of the links 125, the router 120, and one or more of the links 115.

Receiving information at the client device 110 as part of a service, such as receiving streaming content at the client device 110, can rely on adequate or otherwise satisfactory operation of various communication pathways, and components therein, between the client device 110, the router 120, the DNS server 140, and the host server 150. As such, in scenarios in which the client device 110 consumes or otherwise receives content provided by the content delivery platform 160 or other type of content source, the client device 110 can monitor performance of the service in order to determine or otherwise detect service performance issues or potential service performance issues. For instance, service performance issues (such as content streaming issues or lack of access to a service) can originate from telecommunication issues, and can result in unsatisfactory delivery and/or presentation of content at the client device 110. As an illustration, an image being streamed to the client device 110 can be received and presented with artifacts (represented by elements 112a and 112b in FIG. 1) or other types of visual and/or aural issues. It should be appreciated that, in certain embodiments, a service performance issue also can occur or may be present when the client device 110 cannot access the service rather than while the service has been accessed.

In response to detection of a service performance issue, the client device 110 can utilize or otherwise leverage messaging to one or more network components in order to assess telecommunication issues that may be the root-cause of the service performance issue. In certain embodiments, the client device 110 can transmit messages to multiple network components, and can utilize or otherwise leverage responses (reply messages, for example) to determine an operational status of at least one of the network components. In one example, the client device 110 can access or otherwise determine a communication address of the router 120 and can transmit multiple groups of messages thereto. In certain embodiments, accessing or otherwise determining the communication address (e.g., a logical address or a physical address) of the router 120 can include retrieving the communication address from a memory element (e.g., a configuration file) in a memory device that can be local or remote to the client device 110. The client device 110 can transmit or otherwise send the multiple groups of messages to the communication address (e.g., an Internet protocol (IP) address, a media access control (MAC) address, and/or a port number) of the router 120. In certain embodiments, prior to the transmission or submission of at least one message of the multiple groups of messages, the client device 110 can generate the at least one message in accordance with aspects described herein. While multiple groups of messages are described in connection with ping I, the disclosure is not so limited and, in certain embodiments, the client device 110 can transmit one or more messages which may be optionally arranged in one or more groups. In the example operational environment 100, the transmission of the groups of messages to the router 120 is represented as "ping I." In one example, the client device 110 can utilize the ping command that is native to an operating system (OS) thereof, where the client device 110 can execute a ping command for each of the multiple groups of messages. As such, in one example, each transmitted message can be embodied in or can include, for example, an Internet control message protocol (ICMP) Echo (which also may be referred to as ICMP Echo Request). In one embodiment, the multiple groups of messages can include three groups corresponding to execution of three ping commands by the client device 110. It should be appreciated that the disclosure is not so limited and more or less than three groups can be contemplated. Further or in other embodiments, a communication address in accordance with this disclosure can be embodied in or can include a telephone number, a subscriber number, an international mobile subscriber identity (IMSI), an electronic serial number (ESN), an Internet protocol (IP) address, a session initiation protocol (SIP) address, and/or any other information that can be utilized or otherwise leveraged to identify a network component (e.g., a computing device and/or a computing system) with which to establish a communication link for the exchange of data, metadata, audio data, audio metadata, video data, video metadata, and/or signaling associated with such a communication.

The client device 110 also can determine a response from at least one of the multiple groups of messages—e.g., a response can be determined for each of the multiple groups of messages—and can utilize the determined response(s) or absence thereof in order to characterize or otherwise establish an operation condition of the router 120. For instance, the client device 110 can determine that a reply message from at least one of the multiple messages has not been received from the router 120, and can assign a connectivity failure status to the router 120. In example implementations that rely on execution of the ping command or other application layer software that leverages ICMP to transmit messages, the client device 110 can determine a response from the router 120 via the type of ICMP message that is received from the router 120—e.g., "Echo Reply," "Destination Unreachable," "Time Exceeded," or the like. Determination of a "pass" response (e.g., reception of an "Echo Reply" in ICMP) can indicate that the connectivity between the router 120 and the client device 110 is not the root-cause of a detected service performance issue. In the alternative, determination of a "fail" response (e.g., reception of a "Destination Unreachable" ICMP message) can reveal a connectivity issue between the router 120 and the client device 110.

In addition, in further response to the detection of the service performance issue, the client device 110 can access or otherwise obtain a communication address of the DNS server 140, which can be the DNS server configured by a service provider (e.g., an Internet service provider) to serve the client device 110. In certain embodiments, accessing or otherwise determining the communication address of the DNS server 140 can include retrieving the communication address from a memory element (e.g., a configuration file) in a memory device that can be local or remote to the client device 110. For example, the client device 110 can transmit or otherwise send the multiple groups of messages to the communication address (e.g., an IP address or a MAC address) of the DNS server 140. In certain embodiments, prior to the transmission or submission of at least one message of the multiple groups of messages, the client device 110 can generate the at least one message in accordance with aspects described herein. In the example operational environment 100, such a transmission or submission of the multiple groups of messages (e.g., three groups) to the DNS server 140 are represented as "ping II." While multiple groups of messages are described in connection with ping II, the disclosure is not so limited and, in certain embodiments, the client device 110 can transmit one or more messages which may be optionally arranged in one or more groups. In one example, as described herein, the client device 110 can utilize the ping command that is native to the OS of the client device 110, and can execute a ping command for each of the multiple groups of messages. The multiple groups of messages can include, for example, three groups corresponding to the execution of three ping commands. It should be appreciated that the disclosure is not so limited and more or less than three groups can be contemplated. As described herein, while multiple groups of messages are described, the disclosure is not so limited and, in certain embodiments, the client device 110 can transmit one or more messages which may be optionally arranged in one or more groups.

The client device 110 also can determine a response from at least one of the multiple groups of messages (e.g., a response can be determined for each of the multiple groups of messages) transmitted to the DNS server 140. In addition, the client device 110 can utilize the determined response(s) to characterize or otherwise establish an operation condition of the DNS server 140. For instance, the client device 110 can determine that a reply message responsive to at least one of the multiple messages has not been received from the DNS server 140. Accordingly, the client device 110 can assign a networking failure status to the DNS server 140. In example implementations that rely on the execution of the ping command or other application-layer software that leverages ICMP to transmit messages, the client device 110 can determine a response from the DNS server 140 via the type of ICMP message that is received from the DNS server 140—e.g., "Echo Reply," "Destination Unreachable," "Time Exceeded," or the like. Determination of a "pass" response (e.g., reception of an "Echo Reply" in ICMP) can indicate that a networking issue between the DNS server 140 and the client device 110 is not the root-cause of a detected service performance issue. In the alternative, determination of a "fail" response (e.g., reception of a "Destination Unreachable" ICMP message) can reveal a networking issue between the DNS server 140 and the client device 110.

In still further response to the detection of a service performance issue, the client device 110 can transmit or otherwise send multiple groups of messages to the host server 150, utilizing a uniform resource identifier (URI) (such as yahoo.com or sutherland.com) to address the host server 150. In certain embodiments, prior to the transmission or submission of at least one message of the multiple groups of messages, the client device 110 can generate the at least one message in accordance with aspects described herein. In the example operational environment 100, the transmission or submission of the multiple groups of messages (e.g., three groups) to the host server 150 is represented as "ping III." In certain implementations, as described herein, the client device 110 can utilize the ping command that is native to the OS of the client device 110, and can execute a ping command for each of the multiple groups of messages. The multiple groups of messages can include, for example, three groups corresponding to the execution of three ping commands. It should be appreciated that the disclosure is not so limited and more or less than three groups can be contemplated. While multiple groups of messages are described in connection with ping III, the disclosure is not so limited and, in certain embodiments, the client device 110 can transmit one or more messages which may be optionally arranged in one or more groups.

The client device 110 can determine a response to at least one of the multiple groups of messages (e.g., a response can be determined for each of the multiple groups of messages) transmitted to the host server 150. The client device 110 can utilize the determined response(s) to characterize or otherwise establish an operational condition of the DNS server 140. For instance, the client device 110 can determine that a reply message responsive to at least one of the multiple messages transmitted to the host server 150 has not been received from the host server 150, and can assign a name-resolution failure status to the DNS server 140. In example implementations that rely on execution of the ping command or other application-layer software that leverages ICMP to transmit messages, the client device 110 can determine a response from the host server 150 using the type of ICMP message that is received from the host server 150—e.g., "Echo Reply," "Destination Unreachable," "Time Exceeded," or the like. Determination of a "pass" response (e.g., reception of an "Echo Reply" in ICMP) can indicate that a name-resolution issue at the DNS server 140 is not the root-cause of a detected service performance issue. In the alternative, determination of a "fail" response (e.g., reception of a "Destination Unreachable" ICMP message) can reveal a name-resolution issue at the DNS server 140.

The client device 110 can probe multiple network components via respective blocks of messages (which also may be referred to as messaging stages). For example, the router 120, the DNS server 140, and a website hosted by a host server 150 can be probed via ping I, ping II, and ping III, respectively. As such, any response(s) determined by the client device 110 can be concatenated or otherwise leveraged in order to assert a potential root-cause of a detected service performance issue. For instance, implementation of the messaging described herein can permit distinguishing between local connectivity problems (e.g., Wi-Fi connectivity problems); other communication infrastructure problems; and networking problems.

The probing of multiple network components via message passing, or block of messages (e.g., ICMP messages), in accordance with this disclosure may be referred to as "generalized ping" or "super ping" in that multiple messages can be transmitted to each of the multiple network components that are probed, and a respective response may be received. The respective communication addresses of the multiple network components can be accessed or otherwise obtained by the client device 110 prior to transmission of a message of the generalized ping. In certain embodiments, each of the multiple network components can include or can be referred to as a communication endpoint, and probing the multiple network components can include executing, at the client device 110, multiple ping commands directed to the communication endpoint in each of the multiple network components.

In certain embodiments, ping I, ping II, and ping III can be implemented sequentially, in any order. In other embodiments, two or more of ping I, ping II, or ping III can be implemented concurrently or nearly concurrently.

Figure 2:
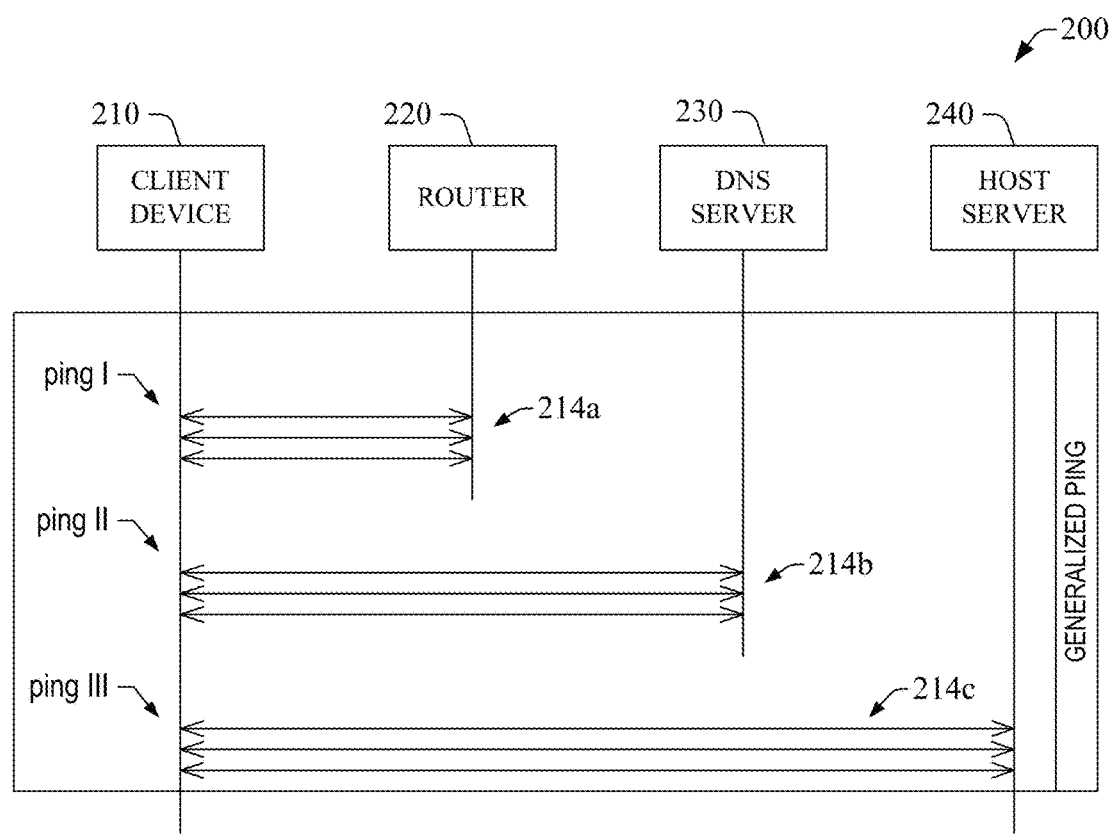
FIG. 2 illustrates an example of a messaging structure for assessment of telecommunication issues in accordance with one or more embodiments of the disclosure.

As an illustration, FIG. 2 presents a diagram 200 of a generalized ping in accordance with aspects of the present disclosure. A client device 210 can access (e.g., retrieve from memory (local to client device or otherwise)) a communication address of a router 220 that can provide service (wireless or otherwise) to the client device 210. Upon or after accessing or otherwise obtaining the communication address the client device 210 can generate and/or transmit, for example, three groups 214*a* of messages (e.g., ICMP Echo Requests) to the router 220. The client device 210 can receive or otherwise determine a response from the router 220 to at least one message in a group of messages. As described herein, such a transmission, including messages and reply messages, can be referred to as "ping I." Similarly, the client device 210 can access a communication address of a DNS server 230 that can be configured by a service provider to permit serving information to the client device 210. Upon or after accessing or otherwise obtaining such a communication address, the client device 210 can generate and/or transmit, for example, three groups 214*b* of messages (e.g., ICMP Echo Requests) to the DNS server 230. The client device 210 can receive or otherwise determine a response from the DNS server 230 to at least one message in a group of messages. As described herein, such a transmission, including messages and reply messages, can be referred to as "ping II." In addition, the client device 210 can generate and/or transmit, for example, three groups 214*c* of messages (e.g., ICMP Echo Requests) to a host server 240 that hosts a specific website (e.g., yahoo.com or sutherland.com). The client device 210 can receive or otherwise determine a response from the host server 240 to at least one message in a group of messages. As described herein, such a detection and transmission, including messages and reply messages, can be referred to as "ping III."

The generalized ping can thus be formed by the transmission of various groups of messages to endpoints, including possibly reply messages from the one or more endpoints. While the diagram 200 in FIG. 2 illustrates a specific sequence of the transmission of messages from the client device 210 to the router 220, the DNS server 230, and the host server 240, the generalized ping is not so limited and can include other sequences or temporal arrangements of the transmission of the groups of messages. In addition or in other embodiments, the transmission of the messages that form a generalized ping need not be sequential, with two or more groups of messages in the generalized ping being transmitted concurrently or nearly concurrently.

Figure 3:
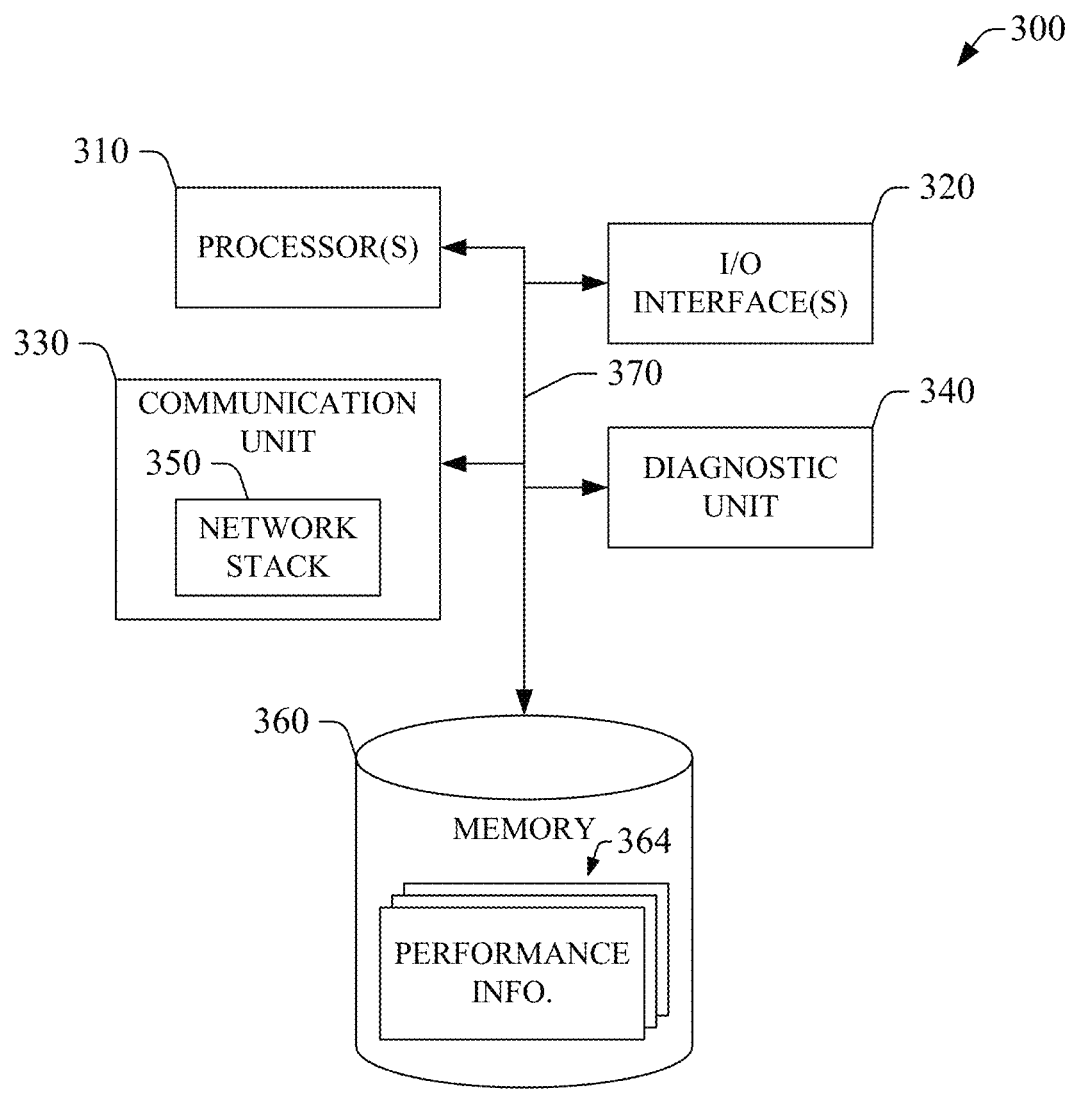
FIG. 3 illustrates an example of a computing device for assessment of telecommunication issues in accordance with one or more embodiments of the disclosure.

FIG. 3 illustrates an example embodiment of a client device 300 that can utilize or otherwise leverage messaging for assessment of telecommunication issues in accordance with one or more aspects of the disclosure. The client device 300 can embody or can constitute the client device 110 or the client device 210 described herein, and can have a form factor suitable for being portable and for permitting incorporation of at least some of the functional elements described herein. As such, in certain embodiments, the client device 300 can be embodied in a dongle, a fob, a stick, or the like.

As illustrated, the client device 300 can include one or more processors 310 that can provide at least some functionality of the client device 300. The client device 300 can include one or more input/output (I/O) interfaces 320 that can exchange information (in wireline format, for example) with other computing devices. In one embodiment, at least one of the I/O interfaces can permit functionally coupling (e.g., communicatively coupling and mechanically coupling) the client device 300 to another device. As such, the I/O interface(s) 320 can include network adapter(s), peripheral adapter(s), and other types of connectors, such as pin, contact, and the like. In certain embodiments, one or more of the network adapter(s) included in the I/O interface(s) 320 can embody or can include a radio unit (not depicted) that can permit wireless transmission, reception, and/or exchange of information with a peripheral or remote device (such as a computing device). The radio unit can operate in accordance with one or more radio technology protocols, including Wi-Fi, Bluetooth, Zigbee, cellular protocols, and the like.

The client device 300 also can include a diagnostic unit 340 that determines if a service performance issue is present when the client device 300 receives information or otherwise accesses a service from a remote computing device (e.g., a router, a DNS server, a host server, a CDN element, or the like). The diagnostic unit 340 can generate a trigger for transmission of a generalized ping in response to a service performance condition being indicative of a service performance issue. The diagnostic unit 340 can determine such a condition. In addition, the client device 300 can include a communication unit 330 that can generate and transmit at least one message (e.g., an ICMP Echo message, a DNS lookup message, or the like) in a generalized ping in accordance with this disclosure. As described herein, the client device 300 can transmit or otherwise send the at least one message to a network component (e.g., a router, DNS server, a host server, or the like) in a network that can provide a data-related service or other type of information service to the client device 300. In order to generate and/or transmit (or send) at least one message in accordance with this disclosure, the communication unit 330 can utilize or otherwise leverage a network stack 350. Specifically, in one example, the network stack 350 can be embodied in or can constitute a library or other type of programming module, and the communication unit 330 can execute the network stack 350 in order to generate a message (e.g., an echo message). Generation of a message can include, for example, generation of control information (e.g., checksum data, communication address(es)) and traffic information (e.g., payload data), and/or formatting of such information into a specific packet header. In addition, the communication device 330 can supply the generate message to the one or more of the I/O interfaces 320. The at least one message can be generated and/or transmitted in response to receiving trigger information from the diagnostic unit 340.

As illustrated, the client device 300 also includes one or more memory devices (generally referred to as memory 360) that can include information associated with service performance, including responses to a generalized ping or a portion thereof in accordance with aspects described herein. Such information can be retained in one or more memory elements 364 (generally referred to as performance information 364). For example, the memory 360 can include key performance indicators (KPIs), such as bit error rates (BERs), packet error rates (PERs), frame error rates (FERs), bandwidth information, network latency metrics, combinations thereof, or the like, which the client device 300 can compare with respective thresholds in order to determine if a service performance is satisfactory. It should be appreciated that such thresholds can be specific to the service that provides information (data, metadata, and/or signaling) to the client device 300. For instance, a threshold indicative of satisfactory performance for a streaming content service can be different from a threshold related to other type of services, such as serving queries, executing library calls, or the like. The memory 360 also can include information indicative of responses (e.g., reply messages or other types of messages) from a probed network component (e.g., a router, a DNS server, a host server, or the like). Such information can include contemporaneous and/or historical responses, and in certain embodiments it can be aggregated. In addition or in alternative embodiments, the memory 360 can include programming logic (e.g., instructions) that, in response to execution, can permit detection of a service performance problem. It should be appreciated that such functionality may supplement or complement the functionality provided by the diagnostic unit 340.

In the illustrated client device 300, a bus architecture 370 (also referred to as bus 370) permits the exchange of information (e.g., data, metadata, and/or signaling) between two or more of at least one of the processor(s) 310, at least one of the I/O interface(s) 320, the communication unit 330, the diagnostic unit 340, and the memory 360. In addition, the memory 360 can include one or more application programming interfaces (APIs) (not depicted in FIG. 3) or other types of programming interfaces that can permit exchange of information (e.g., data and/or metadata) between two or more of the functional elements of the client device 300.

Figure 4:
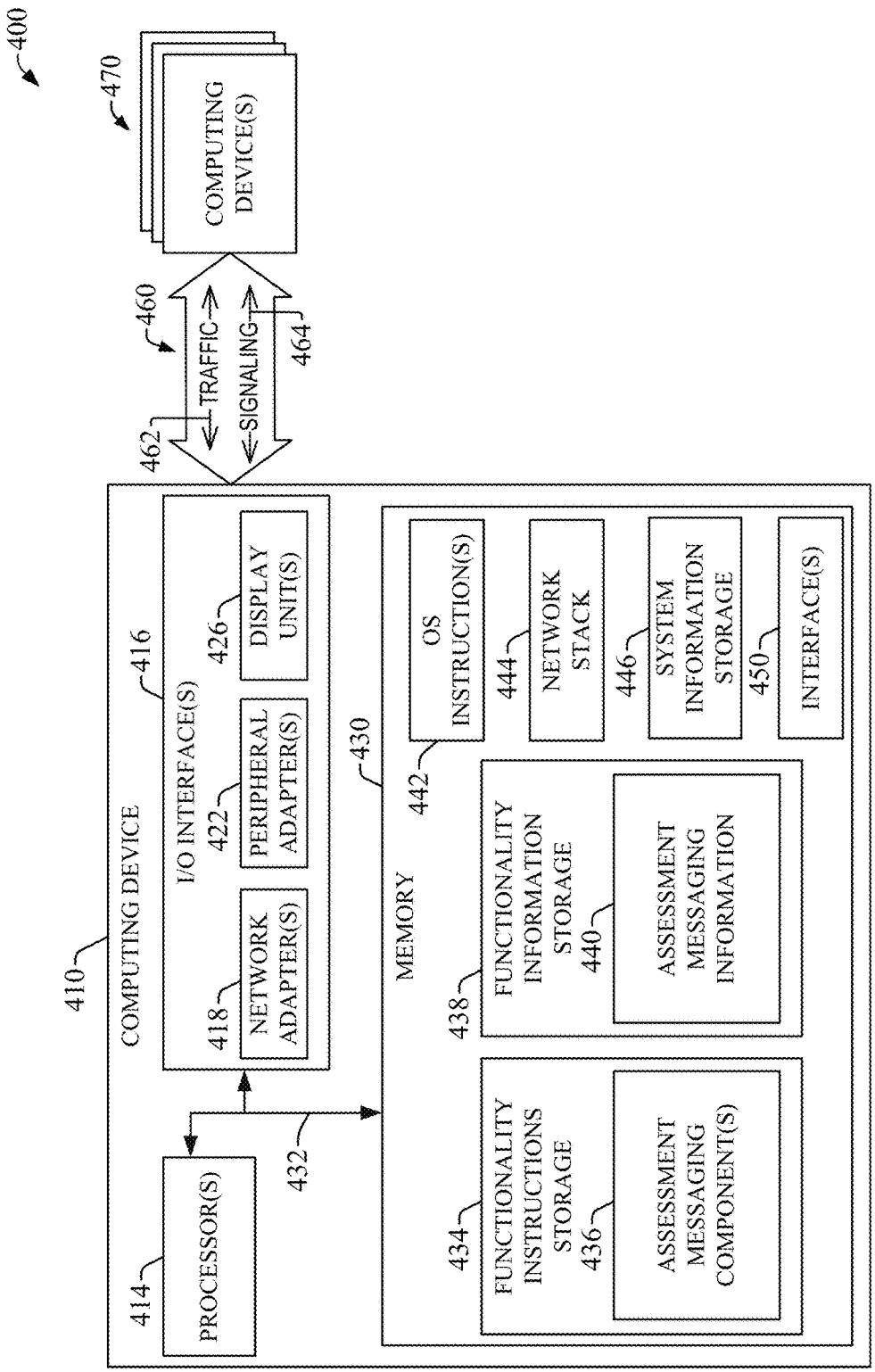
FIG. 4 illustrates an example of a computational environment for assessment of telecommunication issues via messaging in accordance with one or more embodiments of the disclosure.

FIG. 4 illustrates a block diagram of an example computational environment 400 for assessment of telecommunication issues via messaging in accordance with one or more embodiments of the disclosure. The example computational environment 400 is merely illustrative and is not intended to suggest or otherwise convey any limitation as to the scope of use or functionality of the computational environment's architecture. In addition, the illustrative computational environment 400 depicted in FIG. 4 should not be interpreted as having any dependency or requirement relating to any one or combination of components illustrated in the example operational environments of the disclosure. The example computational environment 400 or portions thereof can embody or can constitute the operational environments described hereinbefore. As such, the computing device 410 can embody or can constitute, for example, any of the client devices described herein and can have any form factor suitable for implementation of the functionality described herein. In one example, the computing device 410 can be embodied in or can constitute a portable dongle, a fob, or a stick; a portable personal computer or a handheld computing device, such as a mobile tablet computer, an electronic-book reader, a mobile telephone (e.g., a smartphone), or the like; a television set; a dongle coupled to the television set; and the like. In another example, the computing device 410 can be embodied in a wearable computing device, such as a watch, goggles or head-mounted visors, or the like. In yet another example, the computing device 410 can be embodied in portable consumer electronics equipment, such as a camera, a portable television set, a gaming console, a navigation device, a media playback device, or the like. It should be appreciated that, in at least certain embodiments, the complexity of at least certain functional elements of the computing device 410 can be determined by the form factor of the computing device and/or whether the computing device 410 is coupled (e.g., communicatively coupled and mechanically coupled) to another computing device in order to provide the functionality described herein.

The computational environment 400 represents an example implementation of the various aspects or features of the disclosure in which the processing or execution of operations described in connection with the assessment of telecommunication issues via messaging in accordance with this disclosure can be performed in response to execution of one or more software components at the computing device 410. It should be appreciated that the one or more software components can render the computing device 410, or any other computing device that contains such components, a particular machine for the assessment of telecommunication issues via messaging as described herein, among other functional purposes. A software component can be embodied in or can include one or more computer-accessible instructions, e.g., computer-readable and/or computer-executable instructions. In one scenario, at least a portion of the computer-accessible instructions can embody and/or can be executed to perform at least a part of one or more of the example methods described herein, such as the example method presented in FIG. 5. For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 410 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 410 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with the assessment of telecommunication issues via messaging described herein can include personal computers; server computers; laptop devices; handheld computing devices, such as mobile tablets or e-readers; wearable computing devices; and multiprocessor systems. Additional examples can include set-top boxes, programmable consumer electronics, network personal computers (PCs), minicomputers, mainframe computers, blade computers, programmable logic controllers, distributed computing environments that comprise any of the above systems or devices, and the like.

As illustrated, the computing device 410 can include one or more processors 414, one or more input/output (I/O) interfaces 416, a memory 430, and a bus architecture 432 (also termed bus 432) that functionally couples various functional elements of the computing device 410. The bus 432 can include at least one of a system bus, a memory bus, an address bus, or a message bus, and can permit the exchange of information (data, metadata, and/or signaling) between the processor(s) 414, the I/O interface(s) 416, and/or the memory 430, or respective functional elements therein. In certain scenarios, the bus 432 in conjunction with one or more internal programming interfaces 450 (also referred to as interface(s) 450) can permit such exchange of information. In scenarios in which the processor(s) 414 include multiple processors, the computing device 410 can utilize parallel computing.

The I/O interface(s) 416 can permit communication of information between the computing device and an external device, such as another computing device, e.g., a network element or an end-user device. Such communication can include direct communication or indirect communication, such as the exchange of information between the computing device 410 and the external device via a network or elements thereof. As illustrated, the I/O interface(s) 416 can include one or more of network adapter(s) 418, peripheral adapter(s) 422, and display unit(s) 426. Such adapter(s) can permit or facilitate connectivity between the external device and one or more of the processor(s) 414 or the memory 430. For example, the peripheral adapter(s) 422 can include a group of ports, which can include at least one of parallel ports, serial ports, Ethernet ports, V.35 ports, or X.21 ports. In certain embodiments, the parallel ports can include General Purpose Interface Bus (GPIB), IEEE-1284, while the serial ports can include Recommended Standard (RS)-232, V.11, Universal Serial Bus (USB), FireWire or IEEE-1394.

In one aspect, at least one of the network adapter(s) 418 can functionally couple (e.g., communicatively couple) the computing device 410 to one or more computing devices 470 via one or more traffic and signaling links 460 that can permit or facilitate the exchange of traffic 462 and signaling 464 between the computing device 410 and the one or more computing devices 470. Such network coupling provided at least in part by the at least one of the network adapter(s) 418 can be implemented in a wired environment, a wireless environment, or both. For example, in certain embodiments, at least a portion of the network adapter(s) 418 can embody or can include a radio unit having one or more antennas and a communication processing unit that can permit wireless communication between the computing device 410 and another device, such as one of the computing device(s) 470. The information that is communicated by the at least one of the network adapter(s) 418 can result from the implementation of one or more operations of a method in accordance with aspects of this disclosure. Such output can be any form of visual representation, including, but not limited to, textual, graphical, animation, audio, tactile, and the like. In certain scenarios, each of the computing device(s) 470 can have substantially the same architecture as the computing device 410. In addition or in the alternative, the display unit(s) 426 can include functional elements (e.g., lights, such as light-emitting diodes; a display, such as a liquid crystal display (LCD), a plasma monitor, a light-emitting diode (LED) monitor, or an electrochromic monitor; combinations thereof; or the like) that can permit control of the operation of the computing device 410, or can permit conveying or revealing the operational conditions of the computing device 410.

In one aspect, the bus 432 represents one or more of several possible types of bus structures, including a memory bus or a memory controller, a peripheral bus, an accelerated graphics port, and a processor or local bus using any of a variety of bus architectures. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and the like. The bus 432, and all buses described herein can be implemented over a wired or wireless network connection and each of the subsystems, including the processor(s) 414, the memory 430 and memory elements therein, and the I/O interface(s) 416 can be contained within one or more remote computing devices 470 at physically separate locations, connected through buses of this form, in effect implementing a fully distributed system. In certain embodiments, such a distributed system can implement the functionality described herein in a client-host or client-server configuration in which the assessment messaging component(s) 436 or the assessment messaging information 440, or both, can be distributed between the computing device 410 and at least one of the computing device(s) 470, and the computing device 410 and at least one of the computing device(s) 470 can execute such components and/or leverage such information.

The computing device 410 can include a variety of computer-readable media. Computer-readable media can be any available media (transitory and non-transitory) that can be accessed by a computing device. In one aspect, computer-readable media can include computer non-transitory storage media (or computer-readable non-transitory storage media) and communications media. Example computer-readable non-transitory storage media can be any available media that can be accessed by the computing device 410, and can include, for example, both volatile and non-volatile media, and removable and/or non-removable media. In one aspect, the memory 430 can include computer-readable media in the form of volatile memory, such as random access memory (RAM), and/or non-volatile memory, such as read-only memory (ROM).

The memory 430 can include functionality instructions storage 434 and functionality information storage 438. The functionality instructions storage 434 can include computer-accessible instructions that, in response to execution (by at least one of the processor(s) 414), can implement one or more of the functionalities of the disclosure. The computer-accessible instructions can embody or can include one or more software components illustrated as assessment messaging component(s) 436. In one scenario, execution of at least one component of the assessment messaging component(s) 436 can implement one or more of the methods described herein, such as the example method 500. For instance, such execution can cause a processor (e.g., one of the processor(s) 414) that executes the at least one component to carry out a disclosed example method. It should be appreciated that, in one aspect, a processor of the processor(s) 414 that executes at least one of the assessment messaging component(s) 436 can retrieve information from or retain information in one or more memory elements 440 in the functionality information storage 438 in order to operate in accordance with the functionality programmed or otherwise configured by the assessment messaging component(s) 436. The one or more memory elements 440 may be referred to as assessment messaging information 440. Such information can include at least one of code instructions, information structures, or the like. For instance, at least a portion of such information structures can be indicative or otherwise representative of key performance indicators (KPIs), such as bit error rate (BER), packet error rate (PER), or the like. Such KPIs can embody or can constitute the reference performance information 364.

In certain embodiments, one or more of the assessment messaging component(s) 436 can embody or can constitute one or more of the diagnostic unit 340 and/or the message passing unit 350, and can provide the functionality of such unit(s) in accordance with aspects of this disclosure. In other embodiments, one or more of the assessment messaging component(s) 436 in combination with at least one of the processor(s) 414 can embody or can constitute one or more of the diagnostic unit 340 and/or the message passing unit 350, and can provide the functionality of such unit(s) in accordance with aspects of this disclosure.

At least one of the one or more interfaces 450 (e.g., application programming interface(s)) can permit or facilitate communication of information between two or more components within the functionality instructions storage 434. The information that is communicated by the at least one interface can result from implementation of one or more operations in a method of the disclosure. In certain embodiments, one or more of the functionality instructions storage 434 and the functionality information storage 438 can be embodied in or can include removable/non-removable, and/or volatile/non-volatile computer storage media.

At least a portion of at least one of the assessment messaging component(s) 436 or the assessment messaging information 440 can program or otherwise configure one or more of the processors 414 to operate at least in accordance with the functionality described herein. One or more of the processor(s) 414 can execute at least one of the assessment messaging component(s) 436 and leverage at least a portion of the information in the functionality information storage 438 in order to provide the assessment of telecommunication issues via messaging in accordance with one or more aspects described herein.

It should be appreciated that, in certain scenarios, the functionality instruction(s) storage 434 can embody or can include a computer-readable non-transitory storage medium having computer-accessible instructions that, in response to execution, cause at least one processor (e.g., one or more of the processor(s) 414) to perform a group of operations comprising the operations or blocks described in connection with the disclosed methods.

In addition, the memory 430 can include computer-accessible instructions and information (e.g., data, metadata, and/or programming code instructions) that permit or facilitate the operation and/or administration (e.g., upgrades, software installation, any other configuration, or the like) of the computing device 410. Accordingly, as illustrated, the memory 430 can include a memory element 442 (labeled operating system (OS) instruction(s) 442) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 410 can dictate a suitable OS. The memory 430 also comprises a system information storage 446 having data, metadata, and/or programming code that permits or facilitates the operation and/or administration of the computing device 410. Elements of the OS instruction(s) 442 and the system information storage 446 can be accessible or can be operated on by at least one of the processor(s) 414. As illustrated, the memory 430 also can include a memory element 444 (labeled network stack 444) that contains one or more libraries or other type of computer-accessible instructions that can be utilized or otherwise leveraged for communication between the computing device 410 and another computing device (e.g., one of the computing device(s) 470).

It should be recognized that while the functionality instructions storage 434 and other executable program components, such as the OS instruction(s) 442, are illustrated herein as discrete blocks, such software components can reside at various times in different memory components of the computing device 410, and can be executed by at least one of the processor(s) 414. In certain scenarios, an implementation of the assessment messaging component(s) 436 can be retained on or transmitted across some form of computer-readable media.

The computing device 410 and/or one of the computing device(s) 470 can include a power supply (not shown), which can power up components or functional elements within such devices. The power supply can be a rechargeable power supply, e.g., a rechargeable battery, and it can include one or more transformers to achieve a power level suitable for the operation of the computing device 410 and/or one of the computing device(s) 470, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 418) to connect operationally to the conventional power grid. In another aspect, the power supply can include an energy conversion component, such as a solar panel, to provide additional or alternative power resources or autonomy for the computing device 410 and/or one of the computing device(s) 470.

The computing device 410 can operate in a networked environment by utilizing connections to one or more remote computing devices 470. As an illustration, a remote computing device can be a personal computer, a portable computer, a server, a router, a network computer, a peer device or other common network node, and so on. As described herein, connections (physical and/or logical) between the computing device 410 and a computing device of the one or more remote computing devices 470 can be made via one or more traffic and signaling links 460, which can include wired link(s) and/or wireless link(s) and several network elements (such as routers or switches, concentrators, servers, and the like) that form a local area network (LAN), a wide area network (WAN), and/or other networks (wireless or wired) having different footprints. Such networking environments are conventional and commonplace in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 470) that are functionally coupled (e.g., communicatively linked or otherwise coupled) through a network having traffic and signaling links and related network elements. In a distributed computing environment, in one aspect, one or more software components (such as program modules) can be located in both a local computing device and at least one remote computing device.

Figure 5:
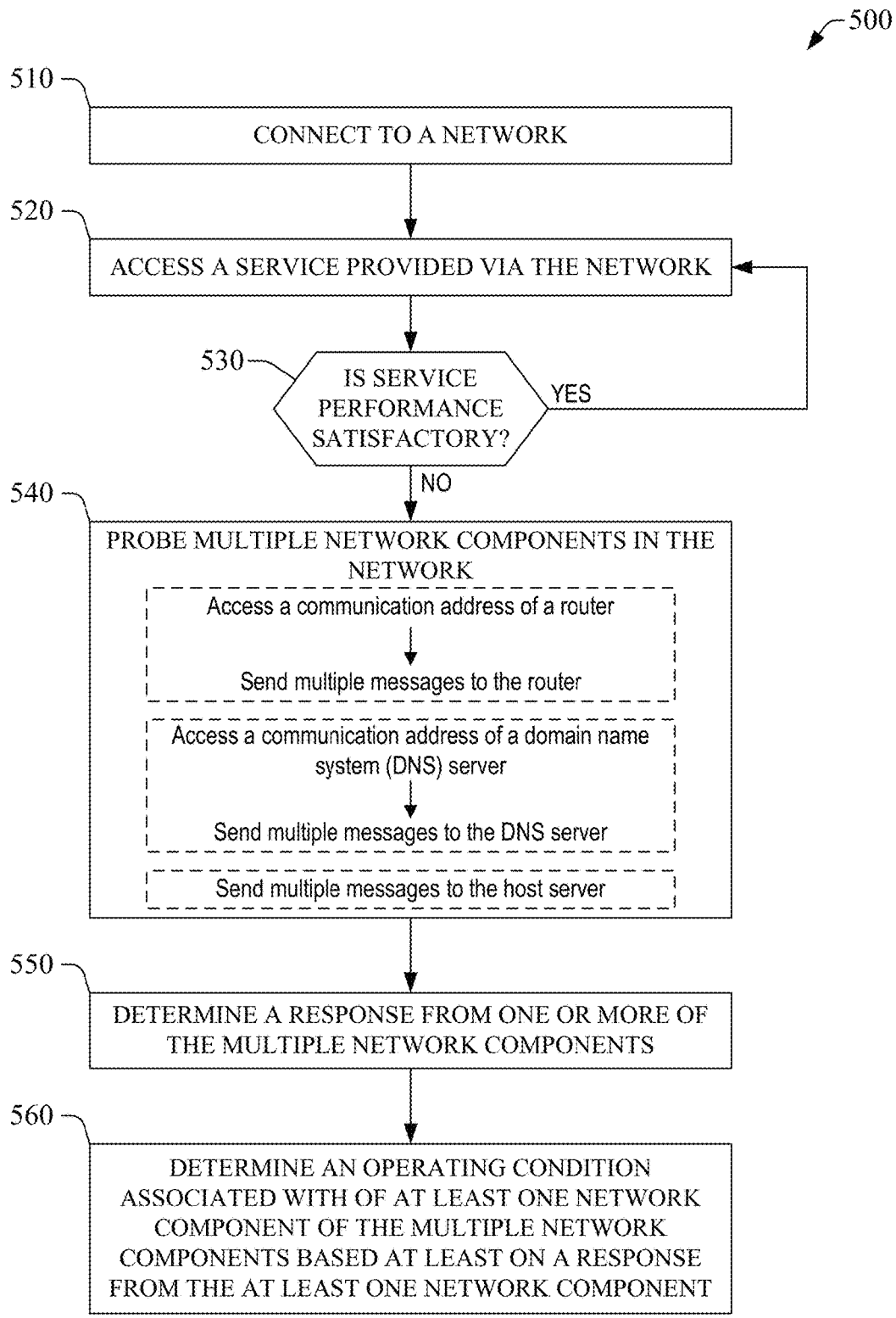
FIG. 5 illustrates an example of a method for assessing telecommunication issues via messaging in accordance with one or more embodiments of the disclosure.

In view of the aspects described herein, example methods that can be implemented in accordance with the disclosure can be better appreciated with reference, for example, to the flowchart in FIG. 5. For purposes of simplicity of explanation, the example method disclosed herein is presented and described as a series of blocks (with each block representing an action or an operation in a method, for example). However, it is to be understood and appreciated that the disclosed method is not limited by the order of blocks and associated actions or operations, as some blocks may occur in different orders and/or concurrently with other blocks from those that are shown and described herein. For example, the various methods (or processes or techniques) in accordance with this disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more features or advantages described herein.

It should be appreciated that the methods in accordance with this disclosure can be retained on an article of manufacture, or computer-readable medium, to permit or facilitate transporting and transferring such methods to a computing device (such as a two-way communication device, such as a mobile smartphone or a voice-over-IP tethered telephone; a blade computer; a programmable logic controller; and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement one or more of the disclosed methods. The code instructions can provide a computer-executable or machine-executable framework to implement the methods described herein.

FIG. 5 presents a flowchart of an example method 500 for assessing telecommunication issues in a network according to one or more embodiments of the disclosure. In certain embodiments, a client device (e.g., a dongle coupled to a television set, a television set, a mobile smartphone, a tablet computer, a set-top box, etc.) having one or more processors or being functionally coupled to at least one processor can implement (e.g., compile, execute, compile and execute, or the like) one or more blocks of the example method 500. The one or more processors of the at least one processor can be functionally coupled to one or more memory devices having encoded thereon computer-accessible instructions that, when executed, can permit implementation of one or more blocks of the subject example method. In one example scenario, the client device 210 can implement the subject example method. In another example scenario, the client device 300 can implement the subject example method. In yet another example scenario, the computing device 410 can implement the subject example method.

At block 510, the client device can connect to a network, which can be embodied in or can include various types of networks, such as a telecommunication network (wireless and/or wireline), a cable network, or the like, each having a specific footprint.

At block 520, the client device can access a service that is provided via the network. As described herein, in one example, the service can be embodied in or can include content streaming, and the content can be generated or otherwise provided by a content delivery platform. In one example, the client device can access the service by executing a software application or other type of module (e.g., a plugin) available to the client device.

At block 530, the client device can determine if performance of the service is satisfactory and/or whether other service performance issues may be present. To that end, in certain embodiments, the computing device can determine a performance indicator associated with the service, and can compare the performance indicator with a threshold. The performance indicator and/or the threshold can be specific to the service. In a scenario in which the service provides streaming content, the performance indicator can characterize reception of at least a portion of the content at the client device. More specifically, yet not specifically, the performance indicator can include packet error rate; bit error rate; frame error rate; quality of service (QoS) parameters; network latency metrics; a combination thereof; or the like. As an illustration, in one embodiment, the client device can utilize or otherwise leverage certain protocols for communication (such as real-time transport protocol (RTP) control protocol) in order to receive information indicative of the QoS.

In response to ascertaining that the service performance is satisfactory and/or service performance issues are absent, the flow of the subject example method can be directed to block 520. In the alternative, in response to ascertaining that the service performance is not satisfactory and/or a service performance issue is present—e.g., a service issue is detected or otherwise determined—the client device can probe multiple network components in the network at block 540. To at least that end, in certain embodiments, the computing device can access at least one communication address of at least one of the multiple network components, and can send one or more messages to the component(s) for which respective communication address(es) can be available. In certain implementations, the client device can generate at least one message of the one or more messages in accordance with aspects described herein prior to sending the at least one message. In addition or in other embodiments, the client device can send one or more messages to at least one of the network components without previously accessing a respective communication address. More specifically, yet not exclusively, the network components can include a router (or gateway) that permits exchange of information with the client device; a DNS server provided by a telecommunication service provider (e.g., an Internet service provider); and a host server hosting a specific host website (e.g., sutherland.com). As illustrated, in one example, the client device can access a communication address of the router, and can send multiple messages to the router. In one aspect, the multiple messages can be arranged in one or more groups. It should be appreciated that, in certain implementations, the client device can send one message to the router. In addition, in another example, the client device can access a communication address of the DNS server, and can send multiple messages to the DNS server. In one aspect, the multiple messages can be arranged in one or more groups. It should be appreciated that, in certain implementations, the client device can send one message to the DNS server. Further, in yet another example, the client device can send multiple messages to the host server. In one aspect, the multiple messages can be arranged in one or more groups. It should be appreciated that, in certain implementations, the client device can send one message to the router.

As described herein, in certain embodiments, each of the multiple network components can include a communication endpoint, and at block 540, the client device can send a group of messages to a component of the multiple network components by executing one or more multiple ping commands directed to the communication endpoint in each of the multiple network components. In certain implementations, each of the multiple ping commands can be native to an operating system of the client device. For instance, in one embodiment, the OS instructions 442 can provide a ping command and at least one of the processor(s) 414 can execute the ping command in order to send a message in such group of messages.

At block 550, the client device can receive at least one response from one or more of the multiple network components probed at block 540. As such, in one example, the client device can receive (e.g., collect information and decode it) a reply message to at least one of a group of messages that can be communicated to the network component at block 540. The specific type of reply message (e.g., a specific type of ICMP message) can establish or otherwise determine the response from the network component. For example, in response to sending a group of ICMP echo messages (e.g., multiple ICMP echo messages) to a router or a communication address thereof, the client device can receive at least one response to the group of ICMP echo messages, and can determine that the at least one response includes an ICMP destination-unreachable message. For another example, in response to sending a group of ICMP echo messages (e.g., multiple ICMP echo messages) to a DNS server or a communication address thereof, the client device can receive a response message to the group of messages, and can determine that the response message includes an ICMP destination-unreachable message. For yet another example, in response to sending a group of ICMP echo messages (e.g., multiple ICMP echo messages) to a host server or a communication address thereof, the client device can receive a response message to the group of ICMP echo messages, and can determine that the response message includes an ICMP destination-unreachable message from the host server.

While not shown, it should be appreciated that in alternative or additional embodiments, the client device can determine that a message has not been received in response to the messages transmitted to the network component, and thus, the client device can assign a specific response (e.g., a timed-out response, a null response, or other type of "fail" response) to the network component.

While not depicted in FIG. 5, in certain embodiments, the client device also can record or otherwise retain the responses determined at block 550. As described herein, such responses can be retained (or logged) for analysis or other type of processing directed to generate service performance information or intelligence. In addition or in other embodiments, the logged information can be combined with other performance information (contemporaneous or historical) that may be available to client device, such as radio-frequency (RF) counters or other types of metrics that can characterize the quality of the connection between the client device and a router, for example. In one implementation, the client device can query specific component integrated therein in order to access RF counters or similar metrics. Further or in yet other embodiments, the client device can supply at least a portion of the responses to another computing device for aggregation and/or other type of analyses directed to determining or otherwise identifying performance features over specific networks, such as deployments specific to certain service providers.

At block 560, the client device can determine an operating (or operational) condition and/or can assign a status (e.g., "pass" or "fail") to the operating condition of at least one network component of the multiple network components probed at block 540 based at least on the at least one response from the at least one network component. As described herein, the operating conditions can include connectivity conditions, telecommunication infrastructure conditions, and/or networking conditions. For example, in response to receiving, from a router, a response message that includes an ICMP destination-unreachable message, the client device can determine that the router is unavailable and can assign a connectivity failure status to the router. For another example, in response to receiving a response message that includes an ICMP destination-unreachable message, the client device can determine that a networking issue can prevent access to the DNS server, and can assign a networking failure status to the DNS server. For yet another example, in response to receiving a response message that includes an ICMP destination-unreachable message from a host server or to failing to receive a response message, the client device can determine that access to a DNS server is available, and that an issue with resolving names at the DNS server is present. As such, the client device can assign a name-resolution failure status to the DNS server.

While not illustrated, in certain embodiments, the example method 500 can include a block at which the client device can detach from an access point having poor connectivity (e.g., the client device logically disconnects from service from the AP) and can attach to a second access point (which can be embodied in a cellular base station, for example) that may be available for communication with the client device.

While in the illustrated example method 500, a service performance issue can be determined after the service is accessed (refer to blocks 520 and 530), the disclosure is not limited in that respect and, in certain embodiments, a service performance issue may occur or otherwise may be present when the service cannot be accessed. In such scenario, the issue associated with lack of access to the service can cause a client device to perform a generalized ping as described herein, implementing blocks 540, 550, and/or 560 of the example method 500.

Various embodiments of the disclosure may take the form of an entirely or partially hardware embodiment, an entirely or partially software embodiment, or a combination of software and hardware (e.g., a firmware embodiment). Furthermore, as described herein, various embodiments of the disclosure (e.g., methods and systems) may take the form of a computer program product comprising a computer-readable non-transitory storage medium having computer-accessible instructions (e.g., computer-readable and/or computer-executable instructions) such as computer software, encoded or otherwise embodied in such storage medium. Those instructions can be read or otherwise accessed and executed by one or more processors to perform or permit the performance of the operations described herein. The instructions can be provided in any suitable form, such as source code, compiled code, interpreted code, executable code, static code, dynamic code, assembler code, combinations of the foregoing, and the like. Any suitable computer-readable non-transitory storage medium may be utilized to form the computer program product. For instance, the computer-readable medium may include any tangible non-transitory medium for storing information in a form readable or otherwise accessible by one or more computers or processor(s) functionally coupled thereto. Non-transitory storage media can include read-only memory (ROM); random access memory (RAM); magnetic disk storage media; optical storage media; flash memory, etc.

Embodiments of the operational environments and methods (or techniques) are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or a method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to the arrangement of steps or operational flow; plain meaning derived from grammatical organization or punctuation; the number or type of embodiments described in the specification or annexed drawings, or the like.

As used in this application, the terms "component," "environment," "system," "architecture," "interface," "unit," "module," "pipe," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, and the electronic components can include a processor therein to execute software or firmware that provides, at least in part, the functionality of the electronic components. In certain embodiments, components can communicate via local and/or remote processes in accordance, for example, with a signal (either analog or digital) having one or more data packets (e.g., data from one component interacting with another component in a local system, distributed system, and/or across a network such as a wide area network with other systems via the signal). In other embodiments, components can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components. The terms "component," "environment," "system," "architecture," "interface," "unit," "module," and "pipe" can be utilized interchangeably and can be referred to collectively as functional elements.

As utilized in this disclosure, the term "processor" can refer to any computing processing unit or device comprising single-core processors; single processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance the performance of user equipment or other electronic equipment.

In addition, in the present specification and annexed drawings, terms such as "store," "storage," "data store," "data storage," "memory," "repository," and substantially any other information storage component relevant to the operation and functionality of a component of the disclosure, refer to "memory components," entities embodied in a "memory," or components forming the memory. It can be appreciated that the memory components or memories described herein embody or comprise non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of the operational or computational environments described herein are intended to include one or more of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of devices, systems, computer-program products, and techniques that can provide messaging for assessment of telecommunication issues in networks that provide a service. It is, of course, not possible to describe every conceivable combination of elements and/or methods for purposes of describing the various features of the disclosure, but it can be recognized that many further combinations and permutations of the disclosed features are possible. Accordingly, it may be apparent that various modifications can be made to the disclosure without departing from the scope or spirit thereof. In addition or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:
1. A device, comprising:
at least one memory device comprising computer-executable instructions; and
at least one processor configured to access the at least one memory device to execute the instructions, and further configured, by the instructions, to:
execute a content streaming application;
receive streaming content associated with the content streaming application;
determine performance information of the streaming content;
determine that the performance information is below a threshold;
generate, based at least in part on the determination that the performance information is below the threshold, a first Internet control message protocol (ICMP) echo message, a second ICMP echo message for a domain name system (DNS) server, and a third ICMP echo message for a host server, wherein the first ICMP echo message is for a router having a first Internet protocol (IP) address, wherein the DNS server has a second IP address, wherein the second ICMP echo message comprises a header indicative of at least the second IP address, wherein the host server hosts a web site, and wherein the first ICMP echo message comprises a header indicative of at least the first IP address;
transmit the first ICMP echo message to the router;
receive a first response to the first ICMP echo message;
assign a fail or pass status to an operational condition of the router by inspecting a type of the first response;

transmit the second ICMP echo message to the DNS server;
receive a second response to the second ICMP echo message;
assign a fail or pass status to an operational condition of the DNS server by inspecting a type of the second response;
transmit the third ICMP echo message to the host server;
receive a third response to the third ICMP echo message; and
assign a fail or pass status to an operational condition of the host server by inspecting a type of the third response.

2. The device of claim 1, wherein the at least one processor is further configured, by the instructions, to determine that the first response includes a destination-unreachable ICMP message, and to identify a connectivity failure between the router and the device.

3. The device of claim 1, wherein the at least one processor is further configured, by the instructions, to determine that the second response includes a destination-unreachable ICMP message, and to identify a telecommunication infrastructure failure between the device and the DNS server.

4. The device of claim 1, wherein the at least one processor is further configured, by the instructions, to determine that the third response includes a destination-unreachable ICMP message, and to identify a name-resolution failure at the DNS server.

5. A method, comprising:
determining performance information associated with content received from a network device, wherein the network device provides the content to a computing device having at least one memory device and at least one processor;
determining that the performance information is below a threshold;
determining that a service performance issue associated with the content is present at the computing device;
sending, based at least in part on the determination that the service performance issue is present, a group of messages that includes a first message to a first device, a second message to a second device, and a third message to a third device, wherein the first device, the second device, and the third device enable a data-related service that provides the content associated with the service performance issue, and wherein at least the first device is a domain name system (DNS) server;
receiving, by the computing device, a response message to the group of messages from the first device; and
determining, by the computing device, an operational condition of the first device based at least in part on data included in the response message.

6. The method of claim 5, wherein each of the first device, the second device, and the third device comprises a communication endpoint, and wherein transmitting the group of messages comprises executing multiple ping commands directed to the communication endpoint in each of the first device, the second device, and the third device, each of the multiple ping commands being native to an operating system of the computing device.

7. The method of claim 5, wherein the second message is sent to a router and wherein the third message is sent to a host server hosting a website.

8. The method of claim 7, further comprising accessing a communication address of the router prior to sending the group of messages to the router, and sending multiple Internet control message protocol (ICMP) echo messages to the communication address.

9. The method of claim 8, wherein determining, by the computing device, the operational condition of the first device based at least in part on the data included in the response message comprises determining, by the computing device, that at least one response to the multiple ICMP echo messages includes an ICMP destination-unreachable message, and assigning a connectivity failure status to the router.

10. The method of claim 7, further comprising accessing a communication address of the DNS server prior to transmitting the group of messages, and sending multiple Internet control message protocol (ICMP) echo messages to the communication address.

11. The method of claim 10, further comprising receiving a response message to the multiple ICMP echo messages,
determining that the response message includes an ICMP destination-unreachable message, and
assigning a networking failure status to the DNS server.

12. The method of claim 7, wherein sending the group of messages to the host server comprises sending multiple ICMP echo messages to the host server.

13. The method of claim 12, further comprising receiving a response message to the multiple ICMP echo messages,
determining that the response message includes an ICMP destination-unreachable message from the host server, and
determining that access to the DNS server is available, and that failure to resolve names at the DNS server is present.

14. A device, comprising:
at least one memory device comprising computer-executable instructions; and
at least one processor configured to access the at least one memory device to execute the instructions, and further configured, by the instructions, to:
determine performance information associated with content received from a network device;
determine that the performance information is below a threshold;
determine that a service performance issue associated with the content is present;
send, based at least in part on the determination that the service performance issue is present, a group of messages that includes a first message to a first device, a second message to a second device, and a third message to a third device, wherein the first device, the second device, and the third device enable a data-related service that provides the content associated with the service performance issue, and wherein at least the first device is a domain name system (DNS) server;
receive a response message to the group of messages from the first device; and
determine an operational condition of the first device based at least in part on data included in the response message.

15. The device of claim 14, wherein each of the first device, the second device, and the third device comprises a communication endpoint, and wherein the at least one processor is further configured, by the instructions, to execute multiple ping commands directed to the communication endpoint in each of the first device, the second device, and the third device, each of the multiple ping commands being native to an operating system of the device.

16. The device of claim 14, wherein the second message is sent to a router and the third message is sent to a host server hosting a website.

17. The device of claim 16, wherein the at least one processor is further configured, by the instructions, to access a communication address of the router prior to submission of the group of messages to the router,
- to send multiple Internet control message protocol (ICMP) echo messages to the communication address included in the group of messages to the router,
- to determine that a reply message to at least one of the multiple ICMP echo messages includes an ICMP destination-unreachable message, and
- to assign a connectivity failure status to the router.

18. The device of claim 16, wherein the at least one processor is further configured, by the instructions, to access a communication address of the DNS server prior to submission of the group of messages to the DNS server,
- to transmit multiple Internet control message protocol (ICMP) echo messages to the communication address included in the group of messages to the DNS server,
- to determine that an ICMP echo reply message responsive to at least one of the multiple ICMP echo messages includes an ICMP destination-unreachable message, and
- to assign a networking failure status to the DNS server.

19. The device of claim 16, wherein the at least one processor is further configured, by the instructions, to send multiple Internet control message protocol (ICMP) echo messages to the host server.

20. The device of claim 19, wherein the at least one processor is further configured, by the instructions,
- to determine that an ICMP echo reply message responsive to at least one of the ICMP echo messages fails to be received from the host server, and
- to determine that access to the DNS server is available, and that a failure to resolve names at the DNS server is present.

\* \* \* \* \*